United States Patent
Tadesse et al.

(10) Patent No.: US 11,735,180 B2
(45) Date of Patent: Aug. 22, 2023

(54) SYNCHRONIZING A VOICE REPLY OF A VOICE ASSISTANT WITH ACTIVITIES OF A USER

(71) Applicant: International Business Machines Corporation, Armonk, NY (US)

(72) Inventors: Girmaw Abebe Tadesse, Nairobi (KE); Sarbajit K. Rakshit, Kolkata (IN); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 17/031,544

(22) Filed: Sep. 24, 2020

(65) Prior Publication Data

US 2022/0093092 A1 Mar. 24, 2022

(51) Int. Cl.
*G10L 15/22* (2006.01)
*G06F 16/9032* (2019.01)
*G06F 16/903* (2019.01)

(52) U.S. Cl.
CPC ........ *G10L 15/22* (2013.01); *G06F 16/90332* (2019.01); *G06F 16/90335* (2019.01)

(58) Field of Classification Search
CPC ................. G10L 15/22; G06F 3/167; G06F 16/90332; G06F 16/90335
See application file for complete search history.

(56) References Cited

U.S. PATENT DOCUMENTS

| 6,269,355 | B1 * | 7/2001 | Grimse | G06F 9/453 |
| | | | | 707/999.102 |
| 8,423,290 | B1 * | 4/2013 | Walsh | G01C 21/20 |
| | | | | 701/423 |
| 8,700,750 | B2 * | 4/2014 | Alam | G06F 8/61 |
| | | | | 707/610 |
| 9,256,660 | B2 * | 2/2016 | Limaye | H04L 49/557 |

(Continued)

FOREIGN PATENT DOCUMENTS

| CN | 104854654 B | | 12/2016 | |
| CN | 108536718 A | * | 9/2018 | G06F 8/38 |

(Continued)

OTHER PUBLICATIONS

"AI Assistance Interaction with Visual Simulation on Edge Device", IP.com No. IPCOM000262813D, IP.com Electronic Publication Date: Jul. 1, 2020, 6 pps., <https://priorart.ip.com/IPCOM/000262813>.

(Continued)

*Primary Examiner* — Daniel C Washburn
*Assistant Examiner* — Oluwadamilola M Ogunbiyi
(74) *Attorney, Agent, or Firm* — David K. Mattheis

(57) ABSTRACT

Aspects of the present invention disclose a method for synchronizing a voice reply from AI voice assistant based on user activities. The method includes one or more processors identifying a task of a user that corresponds to a voice query of the user. The method further includes generating a sequence of sub-activities of the task corresponding to the voice query of the user. The method further includes determining a completion status of each sub-activity of the sequence of sub-activities of the task corresponding to the voice query of the user based at least in part on activity data received from one or more computing devices in an operating environment of the user. The method further includes synchronizing a voice reply of a computing device with the (Continued)

sequence of sub-activities of the task based at least in part on the completion status of each sub-activity of the sequence.

20 Claims, 3 Drawing Sheets

(56) References Cited

U.S. PATENT DOCUMENTS

| | | | | |
|---|---|---|---|---|
| 10,018,478 | B2* | 7/2018 | van Os | G01C 21/3629 |
| 10,585,927 | B1* | 3/2020 | Liao | G06F 16/338 |
| 11,388,291 | B2* | 7/2022 | Van Os | H04M 3/533 |
| 2005/0235208 | A1* | 10/2005 | Arend | G06F 3/0481 |
| | | | | 715/792 |
| 2007/0038633 | A1* | 2/2007 | Bergman | G06F 9/453 |
| 2007/0041542 | A1* | 2/2007 | Schramm | H04L 67/54 |
| | | | | 455/461 |
| 2015/0248435 | A1* | 9/2015 | Solheim | G06F 9/5072 |
| | | | | 707/610 |
| 2015/0347548 | A1* | 12/2015 | Mortensen | G06F 16/2365 |
| | | | | 707/618 |
| 2019/0057079 | A1 | 2/2019 | Raanani | |
| 2019/0095524 | A1 | 3/2019 | Rodgers | |
| 2019/0354813 | A1* | 11/2019 | Riedmiller | G06N 3/006 |
| 2019/0385342 | A1* | 12/2019 | Freeman | G06T 11/00 |
| 2020/0043482 | A1 | 2/2020 | Gruber | |
| 2020/0357395 | A1* | 11/2020 | Mirelmann | G06F 3/167 |
| 2021/0118234 | A1* | 4/2021 | Angelopoulos | G06T 19/006 |
| 2021/0271886 | A1* | 9/2021 | Zheng | G06V 20/41 |
| 2021/0303345 | A1* | 9/2021 | Hamze | G06N 20/00 |
| 2022/0020104 | A1* | 1/2022 | Bishop | H04L 65/4025 |
| 2022/0043984 | A1* | 2/2022 | Miranda | G06F 40/35 |

FOREIGN PATENT DOCUMENTS

| | | | |
|---|---|---|---|
| CN | 111368538 A | | 7/2020 |
| CN | 110569339 B * | 4/2022 | G06F 16/3329 |
| WO | 2018005393 A1 | | 1/2018 |

OTHER PUBLICATIONS

"Method and System for AI Voice Response System to Follow-Up the Activities to Ensure Timely", IP.com No. IPCOM000259258D, IP.com Electronic Publication Date: Jul. 23, 2019, 4 pps., <https://priorart.ip.com/IPCOM/000259258>.

"Method and system for AI Voice response to suggest steps to perform an activity", IP.com No. IPCOM000259023D, IP.com Electronic Publication Date: Jul. 4, 2019, 6 pps., <https://priorart.ip.com/IPCOM/000259023>.

"Method and system for recalling complete or partial voice command submitted to AI voice assistance system", IP.com No. IPCOM000261525D, IP.com Electronic Publication Date: Mar. 12, 2020, 5 pps., <https://priorart.ip.com/IPCOM/000261525>.

Search Report and Written Opinion from International Application No. PCT/IB2021/057028 dated Nov. 9, 2021.

* cited by examiner

SYNCHRONIZING A VOICE REPLY OF A VOICE ASSISTANT WITH ACTIVITIES OF A USER

BACKGROUND OF THE INVENTION

The present invention relates generally to the field of internet of things, and more particularly to synchronizing a voice reply from virtual assistant based on user activities.

In recent years, developments and the growth of Internet of Things (IoT) capable devices have created a wealth of opportunities to advance the capabilities to integrate systems. The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

A virtual assistant, also called an artificial intelligence (AI) assistant or digital assistant, is an application program that understands natural language voice commands and completes tasks for the user. Users can ask their assistants questions, control home automation devices and media playback via voice, and manage other basic tasks such as email, to-do lists, and calendars with verbal commands. The capabilities and usage of virtual assistants are expanding rapidly, with new products entering the market and a strong emphasis on both email and voice user interfaces.

SUMMARY

Aspects of the present invention disclose a method, computer program product, and system for synchronizing a voice reply of an artificial intelligence (AI) based voice assistant with actions of a user based on user activities. The method includes one or more processors identifying a task of a user that corresponds to a voice query of the user. The method further includes one or more processors generating a sequence of sub-activities of the task corresponding to the voice query of the user. The method further includes one or more processors determining a completion status of each sub-activity of the sequence of sub-activities of the task corresponding to the voice query of the user based at least in part on activity data received from one or more computing devices in an operating environment of the user. The method further includes one or more processors synchronizing a voice reply of a computing device with the sequence of sub-activities of the task based at least in part on the completion status of each sub-activity of the sequence of sub-activities of the task.

DETAILED DESCRIPTION

Embodiments of the present invention allow for synchronizing a voice reply from an artificial intelligence (AI) voice assistant based on user activities. Embodiments of the present invention utilize a plurality of data sources to identify past activities of a user related to a query of the user. Additional embodiments of the present invention identify activities of a user that relate to a query of a user. Embodiments of the present invention estimate a time utilized to perform each identified activity to determine whether a user performs a prerequisite subset of activities related to a query of a user. Additional embodiments of the present invention identify one or more stages of activities related to a query of a user where a voice reply is appropriate. Further embodiments of the present invention synchronize voice replies to a query of a user with user activities. Other embodiments of the present invention anticipate future activities (e.g., mistakes, activity patterns, etc.) by a user and generates additional voice reply based on the future activities.

Some embodiments of the present invention recognize that challenges exist with virtual assistants synchronizing voice replies with activities a user performs. For example, while receiving a voice reply from a virtual assistant a user may desire to synchronize the voice reply with on-going activities or future activities the user desires to perform. In this example, the user may have performed some steps of an activity and may want to complete the remaining steps of the activity with voice-based guidance. Embodiments of the present invention determine a step of an activity where voice replies should start, and the timing of the voice replies so that each voice reply is synchronized with a step of the activity of the user.

Embodiments of the present invention can operate to increase efficiency of a computer system by reducing the amount of processing resources the computing system utilizes by reducing the number of tasks executed that correspond to generating unnecessary voice replies. As result, the embodiments of the present invention power consumption associated with transmitting the unnecessary voice replies.

Implementation of embodiments of the invention may take a variety of forms, and exemplary implementation details are discussed subsequently with reference to the Figures.

Figure 1:
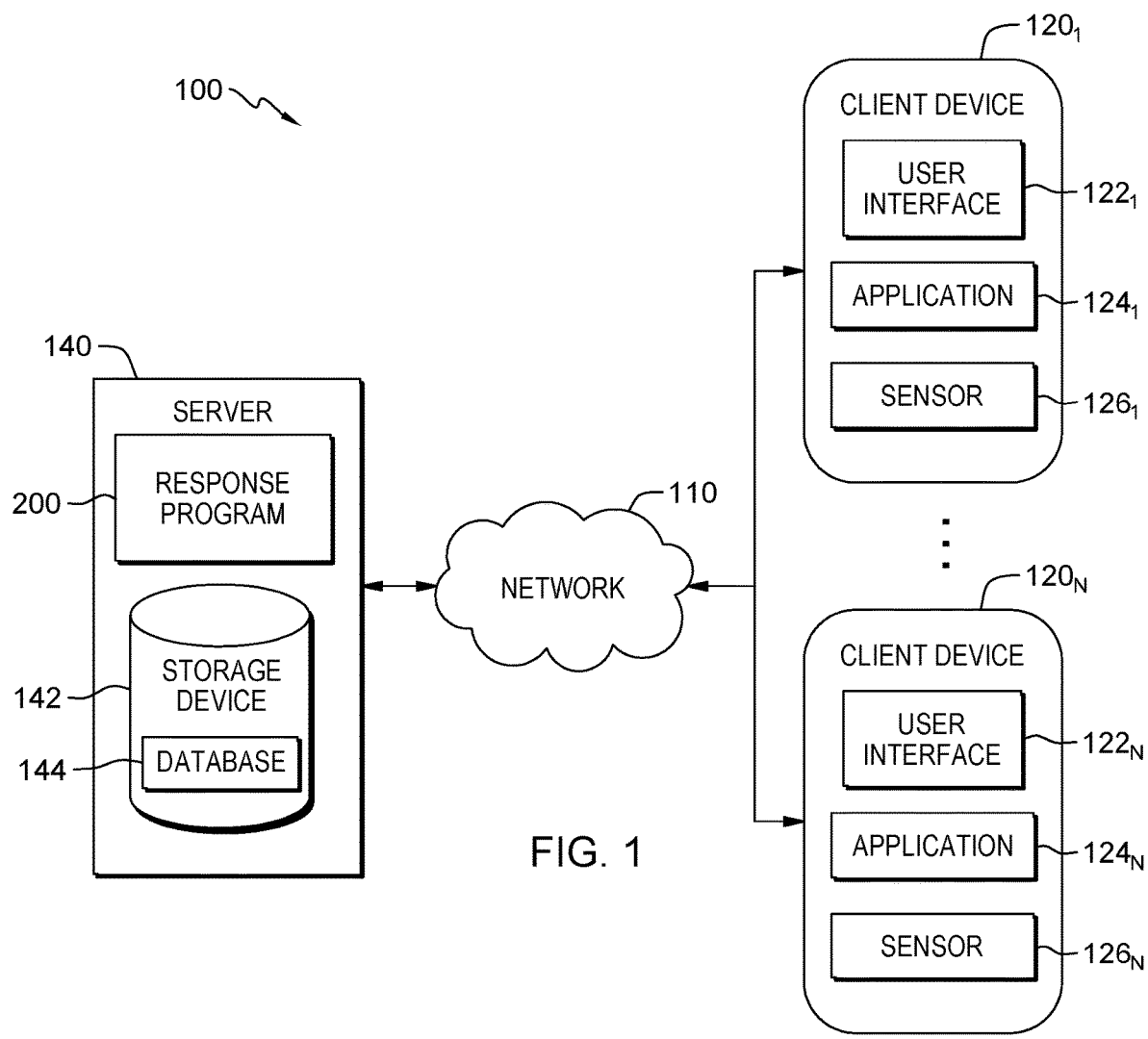
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144 and sensor(s) $126_{1-N}$, which may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Response program 200 enables the authorized and secure processing of personal data. Response program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Response program 200 provides information regarding personal data and the nature (e.g., type, scope, purpose, duration, etc.) of the processing. Response program 200 provides the user with copies of stored personal data. Response program 200 allows the correction or completion of incorrect or incomplete personal data. Response program 200 allows the immediate deletion of personal data.

Distributed data processing environment 100 includes server 140 and client device 120$_1$ through client device 120$_N$, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120$_{1-N}$, and other computing devices (not shown) within distributed data processing environment 100.

Client device 120$_{1-N}$ (i.e., client device 120$_1$ through client device 120$_n$) can be one or more of a laptop computer, tablet computer, smart phone, smart watch, smart speaker, virtual assistant, Internet of Things (IoT) enabled device, or any programmable electronic device capable of communicating with various components and devices within distributed data processing environment 100, via network 110. In general, client device 120$_{1-N}$ represent one or more programmable electronic devices or combination of programmable electronic devices capable of executing machine readable program instructions and communicating with other computing devices (not shown) within distributed data processing environment 100 via a network, such as network 110. Client device 120$_{1-N}$ may include components as depicted and described in further detail with respect to FIG. 3, in accordance with embodiments of the present invention.

Client device 120$_{1-N}$ may include respective instances of user interface 122$_{1-N}$, application 124$_{1-N}$, and sensor 126$_{1-N}$, which each correspond to a respective instance of a client device and perform equivalent functions in the respective instance of the client device. In various embodiments of the present invention, a user interface is a program that provides an interface between a user of a device and a plurality of applications that reside on the client device. A user interface, such as user interface 122$_1$, refers to the information (such as graphic, text, and sound) that a program presents to a user, and the control sequences the user employs to control the program. A variety of types of user interfaces exist. In one embodiment, user interface 122$_1$ is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122$_1$ is a script or application programming interface (API). In one embodiment, user interface 122$_1$ is a voice user interface. A voice-user interface (VUI) makes spoken human interaction with computers possible, using speech recognition to understand spoken commands and answer questions, and typically text to speech to play a reply.

Application 124$_1$ is a computer program designed to run on client device 120$_1$. An application frequently serves to provide a user with similar services accessed on personal computers (e.g., web browser, playing music, e-mail program, or other media, etc.). In one embodiment, application 124$_1$ is mobile application software. For example, mobile application software, or an "app," is a computer program designed to run on smart phones, tablet computers and other mobile devices. In another embodiment, application 124$_1$ is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124$_1$ is a client-side application of response program 200.

Sensor 126$_1$ is a device, module, machine, or subsystem whose purpose is to detect events or changes in an operating environment and send the information to other electronics, frequently a computer processor. Generally, sensor 126$_1$ represents a variety of sensors of client device 120$_1$ that collects and provides various kinds of data (e.g., sound, image, motion, etc.). In one embodiment, client device 120$_1$ transmits data of sensor 126$_1$ to server 140 via network 110. For example, sensor 126$_1$ can be a camera that client device 120$_1$ to capture images of an environment that includes a user, which are transmitted to a remote server (e.g., server 140).

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120$_{1-N}$ and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and response program 200. Storage device 142 can be implemented with any type of storage device, for example, persistent storage 305, which is capable of storing data that may be accessed and utilized by client device $120_{1-N}$ and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes user activities, steps of activities, voice commands, historical activity data, etc. In one embodiment, data processing environment 100 can include additional servers (not shown) that host additional information that accessible via network 110.

Generally, interaction program 200 can enable a user to perform activities based on synchronized voice replies from a voice assistant. In one embodiment, response program 200 identifies a voice query of a user and identifies past activities of a user related to the voice query from a plurality of data sources (e.g., client device $120_{1-N}$). Additionally, response program 200 generates a sequence of activities (e.g., set of steps) corresponding to a task of the voice query and estimates a time spent in each of the identified past activities. Response program 200 utilizes the estimates and/or data of IoT devices (e.g., client device $120_{1-N}$) to determine whether the user has performed one or more steps of the task of the voice query. Also, response program 200 validates whether a user completes the past activities and predicts future activities of the user. Furthermore, response program 200 identifies one or more stages in the sequence of activities where additional voice replies are appropriate and synchronizes the additional voice replies with identified or future activities of the user.

Figure 2:
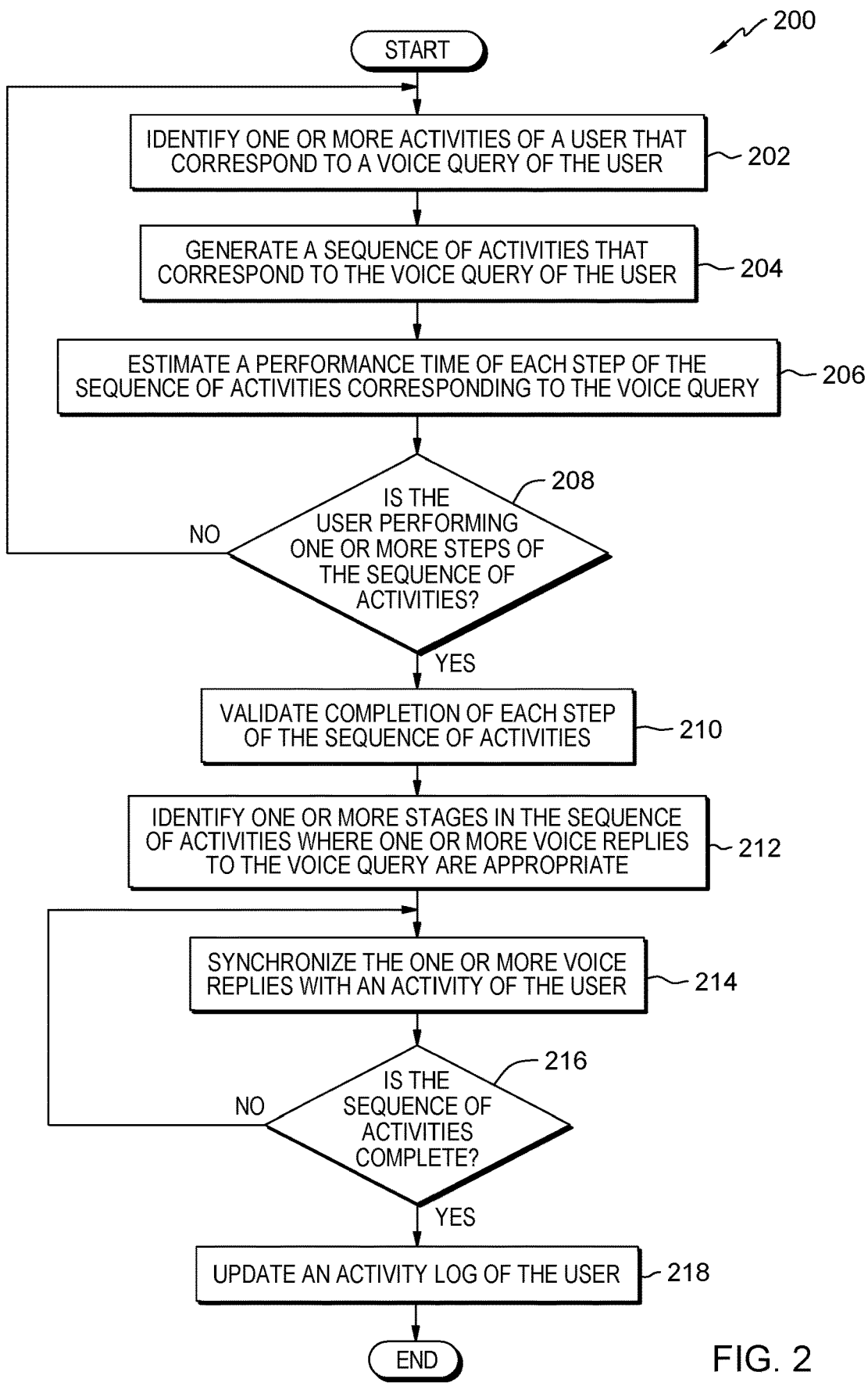
FIG. 2 is a flowchart depicting operational steps of a program for synchronizing a voice reply from an artificial intelligence (AI) voice assistant based on user activities, in accordance with embodiments of the present invention.

FIG. 2 is a flowchart depicting operational steps of response program 200, a program that synchronizes a voice reply from AI voice assistant based on user activities, in accordance with embodiments of the present invention. In one embodiment, response program 200 initiates in response to a user connecting client device $120_1$ to response program 200 through network 110. For example, response program 200 initiates in response to a user registering (e.g., opting-in) a virtual assistant (e.g., client device $120_1$) with response program 200 via a WLAN (e.g., network 110). In another embodiment, response program 200 is a background application that continuously monitors client device $120_1$. For example, response program 200 is a client-side application (e.g., application 124) that initiates upon booting of a virtual assistant (e.g., client device $120_1$) of a user and monitors the virtual assistant for received voice commands.

In step 202, response program 200 identifies one or more activities of a user that correspond to a voice query of the user. In various embodiments of the present invention response program 200 utilizes client device $120_{1-N}$ to collect historical data of a user and generate a collection of data in database 144 corresponding to the user. For example, response program 200 captures activity data (e.g., body movements, biometric data, etc.) of a user from a wearable device and IoT devices (e.g., client device $120_{1-N}$) to determine activities the user performs. Additionally, response program 200 can upload user specific activity logs with identified past activities (e.g., activity data) to generate a corpus (e.g., database 144) corresponding to the user.

In one embodiment, response program 200 identifies a voice command of client device $120_1$ from a user. For example, response program 200 utilizes natural language processing (NLP) techniques (e.g., lexical semantics, relational semantics, terminology extraction, etc.) to determine a topic of a voice query of a user that virtual assistant (e.g., client device $120_1$) receives. Additionally, response program 200 determines a task that corresponds to the voice query of the user.

In another embodiment, response program 200 determines whether one or more activities (e.g., past or presently performed) of a user correspond to the voice command of the user. For example, response 200 utilizes a corpus (e.g., database 144) corresponding to a user to identify one or more activities the user performed historically that are associated with a task that corresponds to a topic of a voice query of the user. In this example, response program 200 utilizes IoT devices (e.g., wearable devices, mobile device, client device $120_{2-N}$, etc.) within an operating environment of the user to track movement behavior, gesture, and biometric data of the user and determine a activity the user is performing. The collection of the activity data (e.g., personal data) is an opt-in service wherein the user provides permission for the collection, processing, and usage of the activity data. Additionally, response program 200 determines whether the task of the voice query corresponds to the current activity of the user. Also, response program 200 can utilize biometric data (e.g., voice signature) of the user to determine whether one or more additional voice queries are related to the voice query of the user.

In an alternative example, response program 200 utilizes activity data of IoT devices (client device $120_{2-N}$) collected prior to submission of a voice query of a user to determine whether the voice query is related to an activity of the user. Also, in scenarios where activity data of IoT devices is not accessible due to either privacy concerns or availability, response program 200 can utilize a question and answer framework (e.g., AI-enabled chatbot, dialogue management, etc.) to obtain the activity or confirmation information from the user.

In step 204, response program 200 generates a sequence of activities that correspond to the voice query of the user. In one embodiment, response program 200 determines one or more activities that correspond to a voice command of a user. For example, response program 200 utilizes a corpus (e.g., database 144) of historical data of a user to determine a task of a voice query of the user. In this example, response program 200 identifies one or more activities of the corpus that correspond to a previous performance of the task by the user and generates list of sub-activities (e.g., steps) required to complete the task. In an alternative example, response program 200 accesses data corresponding to a topic and task of a voice query from the Internet to identify one or more activities (e.g., steps) required to complete the task of the voice query.

In step 206, response program 200 estimates a performance time of each step of the sequence of activities corresponding to the voice query. In one embodiment, response program 200 estimates a time a user uses to perform one or more activities to complete a task that corresponds to a voice command. For example, response program 200 utilizes a corpus (e.g., database 144) of historical data of a user to estimate a performance time of each sub-activity (e.g., steps) required to complete a task of a voice query of the user. In this example, response program 200 utilizes a previous performance time of an activity that corresponds to a sub-activity of the task to estimate the performance time for each sub-activity of the task. Additionally, response program 200 can access remote server that has overall timing parameters corresponding to the task of a voice query from the Internet to estimate the performance time for each sub-activity of the task with respect to the number of sub-activities of the task.

In decision step 208, response program 200 determines whether the user is performing one or more steps of the sequence of activities. In one embodiment, response program 200 utilizes activity data of client device $120_{1-N}$ to determine whether a user is performing one or more activities corresponding to a task of a voice command of the user. For example, response program 200 utilizes IoT devices (e.g., wearable devices, mobile device, client device $120_{1-N}$, etc.) within an operating environment of a user to track activity data (e.g., movement behavior, gesture, biometric data, etc.) of the user to determine a current activity of the user. In this example, response program 200 utilizes a corpus (e.g., database 144) corresponding to the user and the activity data to determine whether the determined activity of the user corresponds to one or more sub-activities of a task of a voice query of the user. Alternatively, response program 200 can utilize a question and answer framework (e.g., AI-enabled chatbot, dialogue management, etc.) to determine whether the user is performing one or more sub-activities of a task of a voice query of a user.

In another embodiment, if response program 200 determines that a user is not performing one or more activities corresponding to a task of a voice command of the user (decision step 208 "NO" branch), then response program 200 monitors activity data of client device $120_{1-N}$ to determine whether one or more activities of the user corresponds to one or more activities corresponding to a task of the voice command of the user. For example, if response program 200 determines that a current activity of a user is not related to one or more sub-activities (e.g., generated in step 204) of a task of a voice query of the user, then response program 200 utilizes IoT devices (e.g., wearable devices, mobile device, client device $120_{1-N}$, etc.) within an operating environment of the user to track movement behavior, gesture and biometric data of the user as discussed above in step 202.

In another embodiment, if response program 200 determines that a user is performing one or more activities corresponding to a task of a voice command of the user (decision step 208 "YES" branch), then response program 200 validates an occurrence of one or more activities to complete a task that corresponds to a voice command as discussed in step 210. For example, if response program 200 determines that a current activity of a user corresponds to one or more sub-activities of a task of a voice query of the user, then response program 200 confirms each of the one or more sub-activities of the task of the voice query the user performs.

In step 210, response program 200 validates completion of each step of the sequence of activities. In one embodiment, response program 200 validates completion of each step of one or more activities to complete a task that corresponds to a voice command of client device $120_1$. For example, response program 200 determines whether a user completes one or more sub-activities of a task of a voice query a virtual assistant (e.g., client device $120_1$) receives. In this example, response program 200 utilizes collected data of IoT devices (e.g., client device $120_{2-N}$) over a defined time period to identify the user performing each of the one or more sub-activities of the task of the voice query. Additionally, response program 200 determines a stage of completion of the task based on the identified the one or more sub-activities of the task. Also, response program 200 can utilize the identified the one or more sub-activities of the task to identify a sub-activity of the task that the user skipped or has not yet performed. Moreover, response program 200 determines whether the user is performing the sub-activity of the task (i.e., determines whether the step is incomplete) and can generate a voice reply to assist the user in the completion of incomplete step. In addition, response program 200 can also utilize an estimated time for each sub-activity as discussed in step 206 to determine whether the user completes the sub-activity.

In another embodiment, response program 200 utilizes client device $120_1$ to validate whether a user performs each step of one or more activities to complete a task that corresponds to a voice command of client device $120_1$. For example, if response program 200 determines activity data of IoT devices is not accessible due to either privacy concerns or availability, then response program 200 can utilize a question and answer framework (e.g., NLP, chatbot, dialogue management, etc.) to obtain a status (e.g., complete, in-progress, not performed) of each of the one or more sub-activities of the task of the voice query from the user.

In step 212, response program 200 identifies one or more stages in the sequence of activities where one or more voice replies to the voice query are appropriate. In one embodiment, response program 200 identifies one or more stages of one or more sub-activities that are appropriate for client device $120_1$ to deliver one or more voice replies to complete a task that corresponds to a voice command. For example, response program 200 identifies one or more sub-activities of a task of a voice query from a user where one or more voice replies are appropriate (e.g., sub-activities that have not been performed) and content of the one or more replies. In this example, response program 200 generates a voice reply for one or more future sub-activities of the one or more sub-activities the user is probable to perform so that response program 200 can intervene based on historical or biometric data prior to the user performing the one or more future sub-activities (e.g., wrong/hazardous steps).

In another embodiment, response program 200 utilizes activity data of client device $120_{1-N}$ to determine whether actions of a user indicate the user prefers voice replies to correlate with one or more stages of one or more activities to complete a task that corresponds to a voice command. In various embodiments of the present invention response program 200 utilizes historical activity data of a user to identify whether a user requires assistance with a step of a task corresponding to a voice command. For example, response program 200 tracks activity patterns of a user and associated behavior and biometric (e.g., blood pressure, heart rate, stress level, etc.) data to determine a comfort level of the user with a sub-activity of the task of the voice query of the user. In this example, response program 200 can utilize the comfort level of the user to identify a sub-activity of the one or more sub-activities the user has not yet performed that corresponds with a decrease in the comfort level of the user.

In step 214, response program 200 synchronizes the one or more voice replies with an activity of the user. In one embodiment, response program 200 correlates a voice reply with a stage of one or more activities to complete a task that corresponds to a voice command. For example, response program 200 receives IoT feeds of one or more IoT devices (e.g., client device $120_{1-N}$) that include activity data to determine whether to disregard one or more sub-activities of a task of a voice query. In this example, response program 200 determines whether a user has completed an activity of the one or more sub-activities based on activity data collected prior to delivering the voice query. Additionally, response program 200 identifies which voice reply of the one or more sub-activities a should be provided to the user based on the completed activity. As result, response program 200 will not repeat or provide voice replies corresponding to activities a user previously performed.

In another example, response program 200 utilizes a historical corpus (e.g., database 144) corresponding to a user to determine a reason (e.g., next steps, validation information, additional information request, etc.) a user transmits the voice query corresponding to the task or a related follow-up voice command. In this example, response program 200 identifies a set of conditions that indicate the user is under stress or experiencing difficulties performing a sub-activity corresponding to the task. Additionally, response program 200 correlates the set of conditions with the user transmitting the voice query to a virtual assistant (e.g., client device $120_1$) to determine the reason the user is transmitting the voice query.

In another embodiment, response program 200 utilizes client device $120_{1-N}$ to monitor user activities of the user to generate and synchronize additional voice replies with physical activities of a user based on activity data of the user. For example, while delivering a voice reply, response program 200 can utilize behavior (e.g., activity data) of a user and IoT data from IoT enabled devices (e.g., client device $120_{1-N}$) within an operating environment of the user to predict a speed the user is probable to complete one or more sub-activities of a task corresponding to a voice query of the user and synchronize future voice replies with physical activities of the user dynamically. Additionally, based on the predicted speed response program 200 can modify a delivery speed of the voice reply. In this example, response program 200 can utilize behavior of the user and the IoT data to predict future activities (e.g., mistakes, activity patterns, etc.) of a user based on historical activity data and generate new voice replies corresponding to the future activities (i.e., response program 200 understands the user is making or will make a mistake and generate correction steps and additional voice replies that synchronized with the current sub-activity the user is performing).

In another example, response program 200 utilizes a question and answer framework (e.g., NLP, chatbot, dialogue management, etc.) of a virtual assistant (e.g., client device $120_1$) to determine a reason a user transmits the voice query corresponding to the task or a related follow-up voice query. In this example, response program 200 can provide an audible prompt to the user to provide a reason for the follow-up voice query or completion status of one or more sub-activities of the task of the voice query and synchronize voice replies with activities of the user with respect to completing the task (i.e., correlate voice replies with current stage of the user's activities/steps).

In various embodiments of the present invention response program 200 can provide voice replies to a user through various communication channels based on an activity type. For example, response program 200 can be embedded with a display system (e.g., computing device) to provide a graphical display of one or more sub-activities of a complex activity, which a visual illustration would aid with conveying the content of a voice reply to a user, of a voice command that the user performs. In another embodiment, response program 200 determines a delivery method of a voice reply corresponding to one or more stages of one or more activities to complete a task that corresponds to a voice command. For example, response program 200 utilizes IoT data of a wearable computing device (e.g., client device $120_2$) of a user to determine time taken by the user to complete one or more sub-activities of a task of a voice query and determine length of time a voice reply corresponding to a sub-activity of the task should run.

In another example, response program 200 determines a command type (e.g., shell, social, web) of a voice query (e.g., voice command) of a user from metadata of the voice query. A shell command can relate to a directory-based system, which can be utilized to identify a location (e.g., path) in a directory of every file, folder, and application of a computing device. A social command can relate to a request-response system (e.g., interactive system), which can be utilized for "what" type of questions. A web command can relate to a web-based command system, which can be utilized to access a uniform resource locator (URL) using a default web browser (e.g., application 124). In this example, response program 200 utilizes a command type to determine a communications channel to provide a voice reply to the user through. In one scenario, if response program 200 determines that a voice query is social command and the user confirms that one or more sub-activities of a task have previously been performed, then response program 200 can utilize natural language generation to generate a summary (e.g., text, audio, multimedia, etc.) of the previously performed sub-activities and transmit the voice reply that includes the summarized sub-activities. Alternatively, if response program 200 determines that one or more sub-activities of a task have previously been performed by the user, then response program 200 can disregard voice replies corresponding to the previously performed sub-activities and transmit a voice reply from a stage from present activity the user performs.

In another example, response program 200 utilizes activity data (e.g., engagement level, distraction level, etc.) of IoT devices (e.g., client device $120_{1-N}$) to determine the number of times to play (e.g., continuous reminder) voice replies. In this example, response program 200 utilizes validation status of step 210 and a corpus (e.g., database 144) of past performances of the user to predict one or more sub-activities of a task that the user is probable to perform incorrectly.

In decision step 216, response program 200 determines whether the sequence of activities is complete. In one embodiment, response program 200 utilizes activity data of client device $120_{1-N}$ to determine whether a user completes each of the one or more activities corresponding to a task of a voice command of the user. For example, response program 200 utilizes IoT devices (e.g., wearable devices, mobile device, client device $120_{1-N}$, etc.) within an operating environment of a user to track activity data (e.g., movement behavior, gesture, biometric data, etc.) of the user to determine whether the user completes each of the one or more sub-activities of a task of a voice query of the user. In this example, response program 200 can utilize a validation status of each of the one or more sub-activities as discussed in step 210 to determine whether the user completes the task.

In another embodiment, if response program 200 determines that a user does not complete one or more activities corresponding to a task of a voice command of the user (decision step 216 "NO" branch), then response program 200 correlates a voice reply with a stage of one or more activities to complete the task that corresponds to the voice command. For example, if response program 200 determines a validation status of one or more sub-activities of a task of a voice query of the user is "incomplete", then response program 200 re-synchronizes voice replies, can provide a status update questions or infer status updates from an IoT or wearable feed (e.g., client device $120_{1-N}$), and transmit a voice reply to the user from a stage where the user is not able to perform a sub-activity of the task. Additionally, response program 200 can continuously monitor physical activities of the user to estimate a speed the user performs one or more sub-activities of the task to determine whether the user is going to make a mistake. As a result, response program 200 identifies various channels to provide a repeat voice reply to the user. Alternatively, response program 200 can continue to provide the voice reply in a synchronized manner with activities of the user.

In another embodiment, if response program 200 determines that a user completes each of the one or more activities corresponding to a task of a voice command of the user (decision step 216 "YES" branch), then response program 200 collects activity data corresponding to a user from client device $120_{1-N}$ to update database 144. For example, if response program 200 determines a validation status of each of the one or more sub-activities of a task of a voice query of the user is "complete", then response program 200 logs activities of the user for future reference as discussed below in step 218.

In step 218, response program 200 updates an activity log of the user. In one embodiment, response program 200 collects activity data corresponding to a user from client device $120_{1-N}$ to update database 144. For example, response program 200 transmits a partial update to an activity log (e.g., database 144) upon completion of a task of a voice query by a user, which enables self-improvement via automatic and/or manual feedback. In this example, response program 200 collects a context (e.g., time, location, surrounding activities, etc.) of the voice query and distinctive patterns identified while the user performs the sub-activities corresponding to the task. Additionally, response program 200 logs a summary of physical activities of the user and stores and updates the activity log for future reference.

Figure 3:
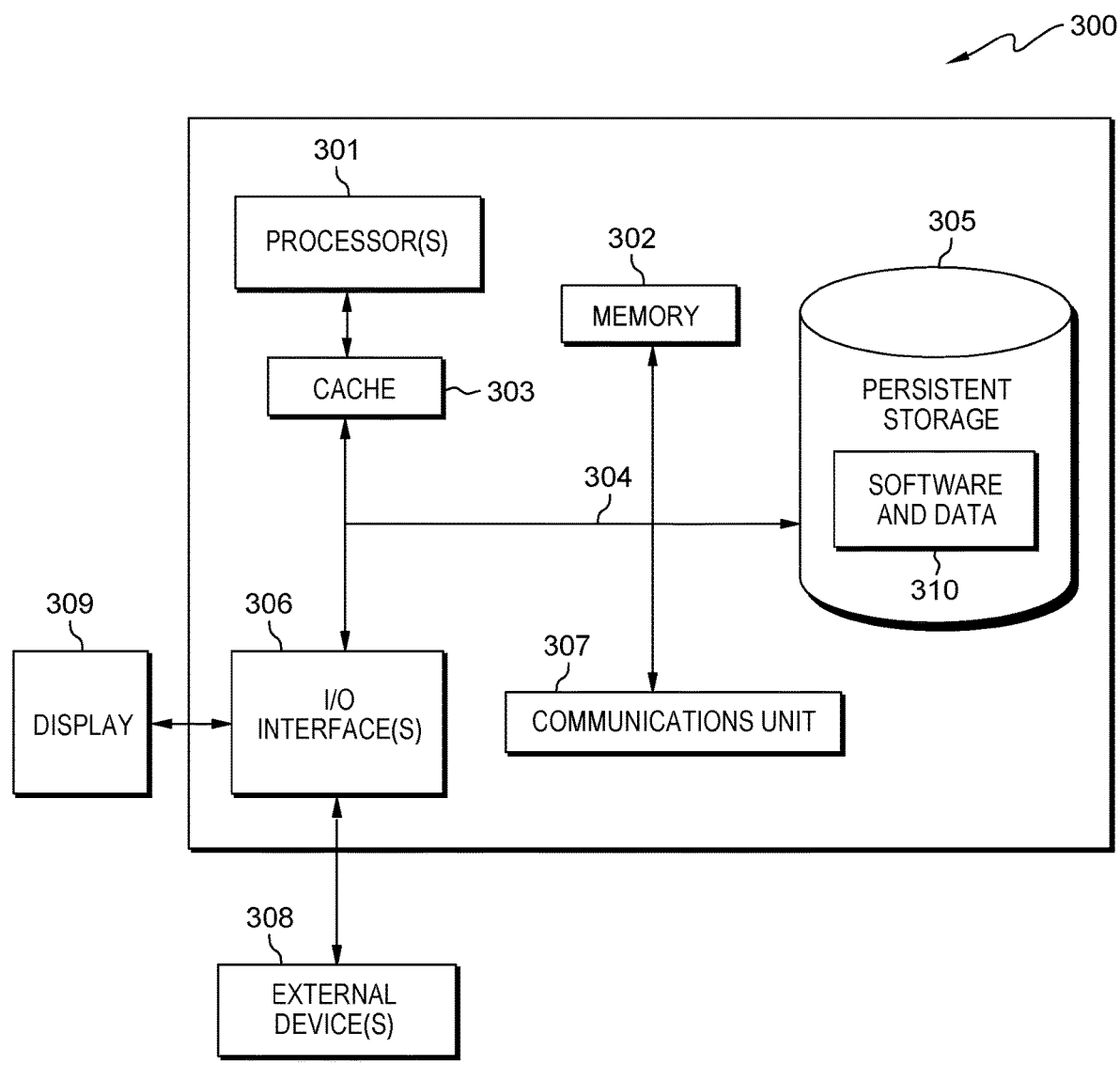
FIG. 3 is a block diagram of components of FIG. 1, in accordance with an embodiment of the present invention.

FIG. 3 depicts a block diagram of components of client device $120_{1-N}$ and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device $120_{1-N}$, software and data 310 includes data of user interface $122_{1-N}$, application $124_{1-N}$, and sensor $126_{1-N}$. With respect to server 140, software and data 310 includes data of storage device 142 and response program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for synchronizing a voice reply of a virtual assistant, the method comprising:
   identifying, by one or more processors, a task of a user that corresponds to a voice query of the user;
   generating, by the one or more processors, a sequence of sub-activities of the task corresponding to the voice query of the user;
   determining, by the one or more processors, a completion status of each sub-activity of the sequence of sub-activities of the task corresponding to the voice query of the user based at least in part on activity data received from one or more computing devices in an operating environment of the user; and
   synchronizing, by the one or more processors, a voice reply to the voice query of the user with the sequence of sub-activities of the task based at least in part on the completion status of each sub-activity of the sequence of sub-activities of the task.

2. The method of claim 1, further comprising:
   determining, by the one or more processors, a respective performance time of each sub-activity of the sequence of sub-activities of the task corresponding to the voice query of the user.

3. The method of claim 1, further comprising:
   determining, by the one or more processors, one or more stages of the sequence of sub-activities of the task that correspond to one or more voice replies of the computing device, wherein respective stages of the one or more stages correspond to one or more sub-activities of the sequence of sub-activities of the task.

4. The method of claim 1, further comprising:
   collecting, by one or more processors, a context of the voice query;
   collecting, by the one or more processors, performance patterns of the user corresponding to the sequence of sub-activities of the task corresponding to the voice query of the user; and
   updating, by the one or more processors, an activity log corresponding to the user and the voice query, wherein the activity log includes the context of the voice query and the performance patterns of the user.

5. The method of claim 1, further comprising:
   determining, by the one or more processors, the activity data of the one or more computing devices within the operating environment of the user is not accessible;
   determining, by the one or more processors, completion status of each sub-activity of the sequence of sub-activities of the task corresponding to the voice query of the user based at least in part on a question and answer framework; and
   determining, by the one or more processors, whether the user completes the sequence of sub-activities of the task corresponding to the voice query of the user.

6. The method of claim 1, further comprising:
   collecting, by the one or more processors, the activity data of one or more computing devices within the operating environment of the user; and
   identifying, by the one or more processors, a sub-activity of the sequence of sub-activities of the task corresponding to the voice query of the user based at least in part on the activity data and historical data corpus corresponding to the user.

7. The method of claim 1, wherein synchronizing the voice reply to the voice query of the user with the sequence of sub-activities of the task based at least in part on the completion status of each sub-activity of the sequence of sub-activities of the task, further comprises:
   determining, by the one or more processors, a stage of the sequence of sub-activities of the task that corresponds to a sub-activity of the task that the user is performing; and
   providing, by the one or more processors, a response to the voice query based at least in part on the sub-activity of the task that the user is performing.

8. A computer program product for synchronizing a voice reply of a virtual assistant, the computer product comprising:
   one or more computer readable storage media and program instructions stored on the one or more computer readable storage media, the program instructions comprising:
   program instructions to identify a task of a user that corresponds to a voice query of the user;
   program instructions to generate a sequence of sub-activities of the task corresponding to the voice query of the user;
   program instructions to determine a completion status of each sub-activity of the sequence of sub-activities of the task corresponding to the voice query of the user based at least in part on activity data received from one or more computing devices in an operating environment of the user; and
   program instructions to synchronize a voice reply to the voice query of the user with the sequence of sub-activities of the task based at least in part on the completion status of each sub-activity of the sequence of sub-activities of the task.

9. The computer program product of claim 8, further comprising program instructions, stored on the one or more computer readable storage media, to:
   determine a respective performance time of each sub-activity of the sequence of sub-activities of the task corresponding to the voice query of the user.

10. The computer program product of claim 8, further comprising program instructions, stored on the one or more computer readable storage media, to:
    determine one or more stages of the sequence of sub-activities of the task that correspond to one or more voice replies of the computing device, wherein respective stages of the one or more stages correspond to one or more sub-activities of the sequence of sub-activities of the task.

11. The computer program product of claim 8, further comprising program instructions, stored on the one or more computer readable storage media, to:
    collect a context of the voice query;
    collect performance patterns of the user corresponding to the sequence of sub-activities of the task corresponding to the voice query of the user; and
    update an activity log corresponding to the user and the voice query, wherein the activity log includes the context of the voice query and the performance patterns of the user.

12. The computer program product of claim 8, further comprising program instructions, stored on the one or more computer readable storage media, to:
    determine the activity data of the one or more computing devices within the operating environment of the user is not accessible;

determine completion status of each sub-activity of the sequence of sub-activities of the task corresponding to the voice query of the user based at least in part on a question and answer framework; and determine whether the user completes the sequence of sub-activities of the task corresponding to the voice query of the user.

13. The computer program product of claim 8, further comprising program instructions, stored on the one or more computer readable storage media, to:

collect the activity data of one or more computing devices within the operating environment of the user; and identify a sub-activity of the sequence of sub-activities of the task corresponding to the voice query of the user based at least in part on the activity data and historical data corpus corresponding to the user.

14. The computer program product of claim 8, wherein the program instructions to synchronize the voice reply to the voice query of the user with the sequence of sub-activities of the task based at least in part on the completion status of each sub-activity of the sequence of sub-activities of the task, further comprise program instructions to:

determine a stage of the sequence of sub-activities of the task that corresponds to a sub-activity of the task that the user is performing; and provide a response to the voice query based at least in part on the sub-activity of the task that the user is performing.

15. A computer system for synchronizing a voice reply of a virtual assistant, the computer system comprising:

one or more computer processors;

one or more computer readable storage media; and program instructions stored on the computer readable storage media for execution by at least one of the one or more processors, the program instructions comprising:

program instructions to identify a task of a user that corresponds to a voice query of the user;

program instructions to generate a sequence of sub-activities of the task corresponding to the voice query of the user;

program instructions to determine a completion status of each sub-activity of the sequence of sub-activities of the task corresponding to the voice query of the user based at least in part on activity data received from one or more computing devices in an operating environment of the user; and program instructions to synchronize a voice reply to the voice query of the user with the sequence of sub-activities of the task based at least in part on the completion status of each sub-activity of the sequence of sub-activities of the task.

16. The computer system of claim 15, further comprising program instructions, stored on the one or more computer readable storage media for execution by at least one of the one or more processors, to:

determine a respective performance time of each sub-activity of the sequence of sub-activities of the task corresponding to the voice query of the user.

17. The computer system of claim 15, further comprising program instructions, stored on the one or more computer readable storage media for execution by at least one of the one or more processors, to:

determine one or more stages of the sequence of sub-activities of the task that correspond to one or more voice replies of the computing device, wherein respective stages of the one or more stages correspond to one or more sub-activities of the sequence of sub-activities of the task.

18. The computer system of claim 15, further comprising program instructions, stored on the one or more computer readable storage media for execution by at least one of the one or more processors, to:

collect a context of the voice query;

collect performance patterns of the user corresponding to the sequence of sub-activities of the task corresponding to the voice query of the user; and update an activity log corresponding to the user and the voice query, wherein the activity log includes the context of the voice query and the performance patterns of the user.

19. The computer system of claim 15, further comprising program instructions, stored on the one or more computer readable storage media for execution by at least one of the one or more processors, to:

determine the activity data of the one or more computing devices within the operating environment of the user is not accessible;

determine completion status of each sub-activity of the sequence of sub-activities of the task corresponding to the voice query of the user based at least in part on a question and answer framework; and determine whether the user completes the sequence of sub-activities of the task corresponding to the voice query of the user.

20. The computer system of claim 15, wherein the program instructions to synchronize the voice reply to the voice query of the user with the sequence of sub-activities of the task based at least in part on the completion status of each sub-activity of the sequence of sub-activities of the task, further comprise program instructions to:

determine a stage of the sequence of sub-activities of the task that corresponds to a sub-activity of the task that the user is performing; and provide a response to the voice query based at least in part on the sub-activity of the task that the user is performing.

* * * * *